United States Patent [19]

Laufer et al.

[11] 4,264,483

[45] Apr. 28, 1981

[54] DECORATING INK

[75] Inventors: Jay K. Laufer, Huntington Station; John J. Marino, Kings Park; Louis M. Zollo, Northport, all of N.Y.

[73] Assignee: Whittaker Corporation, Los Angeles, Calif.

[21] Appl. No.: 928,730

[22] Filed: Jul. 27, 1978

Related U.S. Application Data

[63] Continuation of Ser. No. 500,148, Aug. 23, 1974, abandoned.

[51] Int. Cl.³ .................. C08L 91/00; C08F 8/00; C08L 91/02; C08F 2/46
[52] U.S. Cl. .................. 260/23 TN; 204/159.15; 204/159.19; 204/159.23; 260/18 PF; 260/18 EP; 260/22 EP; 260/22 TN; 260/23 EP
[58] Field of Search ............ 106/19, 20, 22, 23; 204/159.13, 159.15, 159.23; 260/18 PF, 18 EP, 23 EP, 23 TN, 22 EP, 22 TN

[56] References Cited

U.S. PATENT DOCUMENTS

| | | | |
|---|---|---|---|
| 3,200,086 | 8/1965 | Coleman | 260/18 PN |
| 3,308,076 | 3/1967 | De Lia et al. | 260/18 PN |
| 3,551,246 | 12/1970 | Bassemir et al. | 204/159.15 |
| 3,552,986 | 1/1971 | Bassemir et al. | 106/20 |
| 3,673,140 | 6/1972 | Ackerman | 204/159.19 |
| 3,803,109 | 4/1974 | Nemoto et al. | 204/159.23 |
| 3,825,479 | 7/1974 | Carlick et al. | 204/159.23 |
| 3,876,518 | 4/1975 | Borden et al. | 204/159.23 |
| 3,878,169 | 4/1975 | Guillet et al. | 260/40 R |

OTHER PUBLICATIONS

Chem Abs., (87): 40877u, Weiss et al., "Radiation Curable Coating Comp. & Inks".

*Primary Examiner*—Joseph L. Schofer
*Assistant Examiner*—Herbert J. Lilling
*Attorney, Agent, or Firm*—Henry M. Bissell

[57] ABSTRACT

This invention relates to a radiation curable decorating ink comprising:
at least one acrylic monomer or oligomer;
at least one photoreactive resin;
at least one photoinitiator;
at least one free radical inhibitor; and
at least one pigment.

This invention also relates to novel photoreactive resins.

5 Claims, No Drawings

DECORATING INK

This is a continuation of application Ser. No. 500,148, filed Aug. 23, 1974, and now abandoned.

BRIEF DESCRIPTION

This invention relates to radiation curable lithographic metal decorating inks.

The novel inks of this invention comprise acrylic monomers or oligomers, a photoreactive resin, photoinitiators, free radical inhibitor, pigments, waxes and fillers.

The radiation curable lithographic metal decorating inks of this invention are capable of forming hard, thermoset polymeric films when exposed to ultra violet or electron beam radiations. When using ultra violet radiation, the process is known as photopolymerization.

The inks of this invention are primarily designed for metal decorating application. A wet lithographic or a dry offset process can be used in printing these inks to the various metal substrates. In the wet lithographic process, a dahlgren dampening system is preferred over the acid etch fountain solution systems.

The inks can be printed with already existing commercial metal decorating presses. The presses do not need any special blankets or rollers.

Metal substrates to which the inks can be printed to include electrolytic tin plate, sized tin free steel, aluminum, alkyd or acrylic white coated electrolytic tin plate or tin free steel.

Curing of these inks is best accomplished with medium pressure mercury arc lamps which emit high intensity radiation in the ultra violet region of the spectrum. These lamps are most efficient when mounted in an elliptical reflector. An example of these lamps is the Hanovia 200 watt per linear inch medium pressure, high intensity uviarc.

PREFERRED SPECIFIC EMBODIMENTS

This invention relates to a radiation curable decorating ink comprising:
  at least one acrylic monomer or oligomer;
  at least one photoreactive resin;
  at least one photoinitiator;
  at least one free radical inhibitor; and
  at least one pigment.

The inks of this invention after being photopolymerized exhibit good adhesion on sized tin free steel, alkyd or acrylic white coated metal substrates, and electrolytic tin plate. Following photopolymerization, a bake cycle will tend to further improve adhesion and hardness of the ink films. This bake cycle is necessary when the metal decorated substrates are to be used for beer or carbonated beverage containers because of the pasteurization process required for these containers. There is no need for a bake cycle if the container is not going to receive pasteurization. Baking cycles ranging from 140°–180° C. for periods of time ranging from 5–10 minutes are sufficient for these inks.

The monomers that can be polymerized by the process of this invention are the polymerizable ethylenically unsaturated monomers containing at least one polymerizable ethylenically unsaturated group of the structure:

$$>C=C<$$

The process can be used to polymerize a single monomer or a mixture of two or more monomers throughout the entire concentration ranges possible, selected solely to suit the scientist's purpose. The monomers can be aliphatic, aromatic, cycloaliphatic, or any variant thereof. Illustrative thereof one can mention the olefinic hydrocarbons containing up to about 18 carbon atoms such as ethylene, propylene, butylenes, pentenes, hexenes, dodecene, heptenes, octenes, styrene, 4-methylstyrene, alpha-methylstyrene, cyclopentadiene, dicyclopentadiene, butadiene, hexadiene, bicyclo[2.2.1]-hept-2-ene, bicyclo[2.2.1]hept-2,5-diene, methylbicyclo[2.2.1]hept-2-ene, cyclohexene, 4-methyl-1-pentene, 5-methyl-1-hexene, and the like; acrylic acid and its derivatives, such as acrylonitrile, methacrylonitrile, acrylamide, methacrylamide, methacrylic acid, methyl methacrylate, ethyl methacrylate, ethyl acrylate, 2-ethylhexyl acrylate, butoxyethoxyethyl acrylate, neopentyl glycol diacrylate as well as others hereinafter discussed, and the like. Other suitable monomers are readily apparent to those skilled in the art; this listing is illustrative only and not all-inclusive. The preferred monomers include styrene and its derivatives and the acrylyl and methacrylyl compounds and derivatives thereof. Oligomers can also be used; oligomers, as is well known, are low molecular weight polymerizates.

The isocyanates which can be employed correspond to the formula:

$$R(NCO)_m$$

wherein R represents aryl or aralkyl which can be ring substituted with a variety of substituents including methyl, ethyl, propyl, chlorine, bromine, chloroalkyl, and m represents 1 or 2. It is pointed out that the nature and number of substituents on the ring is not critical. Specific isocyanates encompassed by the above formula include phenyl isocyanate, benzyl isocyanate, vinylphenyl isocyanate, phenyl-meta-diisocyanate, benzyl-meta-diisocyanate, toluene diisocyanate, chlorophenyl isocyanate, etc. Examples of suitable diisocyanate materials are methylene diisocyanate, hydrogenated methylene bisphenylene diisocyanate and toluene diisocyanate, with toluene diisocyanate being preferred.

Suitable polyhydric alcohols that can be employed include 1,6-hexanediol, pentaerythriol, hydroxyethyl acrylate, oleyl, lauryl, octyl, $C_{12}$-$C_{14}$ alcohols, benzyl and furfuryl.

The preferred acrylic monomers of these inks include 1,6-hexanediol diacrylate and the diurethanes of 0.6 mole of toluene diisocyanate reacted with one mole of pentaerythritol triacrylate and 0.6 mole of one of the following alcohols:
  hydroxyethyl acrylate (PETA-TDI-HEA)
  oleyl alcohol (PETA-TDI-OLEYL)
  lauryl alcohol
  octyl alcohol
  $C_{12}$-$C_{14}$ alcohols
  benzyl alcohol
  furfuryl alcohol The diurethanes of TDI plus pentaerythritol triacrylate plus hydroxyethyl acrylate and oleyl are preferred over the rest.

The term "acrylic monomer" as employed herein means a resin formed from acrylic monomers, and also means a resin formed from acrylic monomers and of non-acrylic monomers. The acrylic resins and the modified-acrylic resins when employed herein as starting materials for the preparation of the urethane-modified resins may have molecular weights as high as 1,000,000, preferably in the range of about 1,000 to about 25,000.

Preferred "acrylic monomers" are:
the reaction product of one mole of pentaerythritol triacrylate; 0.6 mole of toluene diisocyanate and 0.6 mole of hydroxyethyl acrylate; and
the reaction product of one mole of pentaerythritol triacrylate; 0.6 mole of toluene diisocyanate and 0.6 moles of oleyl alcohol.

The novel photoreactive resin in the ink of this invention consists of the reaction product ester of o-benzoylbenzoic acid and epoxidized oil. The resin has the necessary hydrocarbon chain functionality which is essential for good pigment wetting.

Preferred photoinitiators are benzophenone, Michler's ketone and mixtures thereof. Particularly preferred sensitizers have been found to be mixtures of Michler's ketone and benzophenone in proportions of 1 to 8, respectively by weight; also benzophenone alone.

The photoinitiators can be ethers of benzoin, such as methyl ether of benzoin; p,p'-substituted benzophenones such as 4,4'-bis(dimethylamino) benzophenone and 4,4'-bis(diethylamino) benzophenone; or bis(1-anthraquinonyl amino) anthraquinones such as 1,4-bis(1-anthraquinoyl amino) antraquinone and 1,5-bis(1-anthraquinonyl amino) anthraquinone, and combinations thereof. Other useful sensitizing agents include polynuclear quinones such as 1,2-benzanthraquinone and 2-methyl anthraquinone; mononuclear quinones such as 2,5-diphenyl-p-quinone; aromatic α-diketones such as benzil; substituted aryl methylene dioxy compounds such as piperanol, piperoin, 3,4-methylene dioxychalcone, and 5,6-methylene dioxyhydrindone-1; substituted β-naphthoselenazolines such as 1-methyl-2-acetyl methylene-β-naphthoselenazoline, substituted β-benzothiazolines such as 3-methyl-2-benzoyl methylene benzothiazoline, substituted β-naphthothiazolines such as 1-methyl-2-menzoyl methylene-β-naphthothiazoline; anthrones such as anthrone; benzanthrones such as benz-2-ethylbenzanthrone and 7-H-benz(de)-anthracen-7-one; and azabenzanthrones such as 2-keto-3-methyl-1,3-diazabenzanthrone.

The concentration of sensitizer in the ink composition depends upon the sensitive polymeric compound, i.e. the aryl polyallyl prepolymer, present. In the case of the prepolymer of diallyl isophthalate, from about 1 to 20%, preferably 1.5 percent by weight of prepolymer, of 1,4-bis(1-anthraquinonyl amino) anthraquinone can be used. Some sensitizers, such as p,p'-substituted benzophenones, e.g. 4,4'-bis(dimethylamino) benzophenone, in an amount less than 1.5%, cause a considerable increase in sensitivity to actinic light. The sensitizer is excited by the actinic radiation, and, in turn, initiates the polymerization. The mechanism of the reaction is believed to be that the sensitizer dissociated into free radicals by the actinic radiation or energy that it absorbs, and the resulting free radicals initiate cross-linking of the prepolymer to render it insoluble.

Photoinitiators for this ink system include benzophenone, benzil, furil, and Michler's ketone. These photoinitiators provide the free radicals when irradiated which are necessary to initiate the vinyl addition polymerization of these inks. The photoinitiator can be used alone or in combination with one another. For example, using benzophenone or benzil in combination with Michler's Ketone gives much more rapid cure rates in the ink system than using these initiators alone. Tertiary akanol amines such as triethanolamine, methyl diethanolamine, and diisopropyl ethanolamine are used with the photo-initiators to accelerate the rate of cure.

Other amines that are suitable in this invention as activators can have one or more amino groups in the molecule; they can be primary, secondary or tertiary amino groups. The preferred organic amines are the tertiary amines with the alkanol amines most preferred. The organic amines can be aliphatic amines aromatic amines having at least one N-alkyl group, heterocyclic amines, or combinations thereof. They can be substituted or unsubstituted, wherein the substituents can be, for example, halogen atoms, hydroxyl groups or alkoxy groups.

The amines can be represented by the general formula:

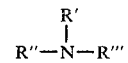

wherein $R'$ and $R''$ taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, arkaryl having from 6 to about 12 ring carbon atoms; $R'''$ has the same meaning as $R'$ and $R''$ with the exceptions that it cannot be hydrogen and that it cannot be aryl when both $R'$ and $R''$ are aryl. When taken together $R''$ and $R'''$ can be a divalent alkylene group ($-C_nH_{2n}-$) having from 2 to about 12 carbon atoms, a divalent alkenylene group $-(C_nH_{2n-1})-$ group having from 3 to about 10 carbon atoms, a divalent alkadienylene group $-(C_nH_{2n-2})-$ group having from 5 to about 10 carbon atoms, a divalent alkatrienylene group $-(C_nH_{2n-3})-$ having from 5 to about 10 carbon atoms, a divalent alkyleneoxyalkylene group $-(C_xH_{2x}OC_xH_{2x})-$ having a total of from 4 to about 12 carbon atoms, or a divalent alkyleneaminoalkylene group

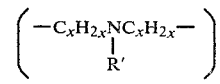

having a total of from 4 to about 12 carbon atoms. As previously indicated, the amines can be substituted with other groups; thus, the $R'$, $R''$ and $R'''$ variables, whether taken singly or together, can contain one or more substituents thereon. The nature of such substituents is generally not of significant importance and any substituent group can be present that does not exert a pronounced deterrent effect on the crosslinking reaction.

Illustrative of suitable organic amines one can mention methylamine, dimethylamine, trimethylamine, diethylamine, triethylamine, propylamine, isopropylamine, diisopropylamine, triisopropylamine, butylamine, tributylamine, t-butylamine, 2-methylbutylamine, N-methyl-N-butylamine, di-2-methylbutylamine, trihexylamine, tri-2-ethylhexylamine, didecylamine, tridodecylamine, tri-2-chloroethylamine, di-2-bromoethylamine, methanolamine, ethanolamine, diethanolamine, triethanolamine, methyldiethanolamine, dimethylethanolamine, methyldiethanolimine, iropropanolamine, propanolamine, diisopropanolamine, triisopropanolamine, butylethanolamine, dihexanolamine, 2-methoxyethylamine, di-2-ethoxyethylamine, tri-2-ethoxyethylamine, 2-hydroxyethyldiisopropylamine, 2-aminoethylethanolamine, allylamine, butenylamine, dihexadientylamine, cyclohexylamine, tricyclohexylamine, trimethylcyclohexylamine, bis-methylcyclopentylamine, tricyclohexenylamine, tricyclohexadienylamine, tricyclopentadienylamine, N-methyl-N-cyclohexylamine, N-2-ethylhexyl-N-cyclohexylamine, diphenylamine, phenyldimethylamine, methylphenylamine, ditolylamine, trixylylamine, tribenzylamine, triphenethylamine, benzyldimethylamine, benzyldihexylamine, tris-chlorophenethylenimine, N-methylethylenimine, N-cyclohexylethylenimine, piperidine, N-ethylpiperidine, 2-methylpiperidine, 1,2,3,4-tetrahydropyridine, 1,2-dihydropyridine, 2-, 3- and 4-picoline, morpholine, and N-methylmorpholine.

In commercial applications, these inks can be cured at speeds ranging from 260 to 500 fpm. The speed of cure depends largely on the number of lamps being used and the color of the ink being photopolymerized. For instance, an ultra violet curable yellow colored metal decorating ink of this invention can be cured at speeds up to 400 fpm using two 200 watt per linear inch lamps while a black ink of the same invention would require five 200 watt per linear inch lamps to cure at the same speed.

The inks of this invention after being photopolymerized exhibit good adhesion on sized tin free steel, alkyd or acrylic white coated metal substrates, and electrolytic tin plate. Following photopolymerization, a bake cycle will tend to further improve adhesion and hardness of the ink films. This bake cycle is necessary when the metal decorated substrates are to be used for beer or carbonated beverage containers because of the pasteurization process required of these containers. There is no need for a bake cycle if the container is not going to receive pasteurization. Baking cycles ranging from 143.3–176.6° C. for periods of time ranging from 5–10 minutes are sufficient for these inks.

Most any commercial pigment can be used with this ink system. Among them are rhodamines, rubines, lithols, red lake C, 2-B reds, phthalo blues and greens, carbon blacks, alkali blues, methyl violets, moly oranges, benzidine yellows, chrome yellows, carbazole violets, etc. A few pigments cannot be used in this system because of stability problems. For example, iron blues have very limited stability.

Fillers and waxes which are used in conventional inks can also be used in this ink system. Magnesium carbonate, aluminum carbonate, fumed silicas, waxes such as polyethylenes, polytetrafluoroethylenes, fatty esters, and fatty amides can be used.

Suitable aniline dyes for the purpose of the invention include, for example, Iosol Red, B.C. 74708; Iosol Black, B.C. 74704; Iosol Yellow, B.C. 74711; Iosol Orange, B.C. 74707; Iosol Violet, B.C. 74710; Iosol Green, B.C. 74706; and Iosol Blue, B.C. 74705. All of the above dyes are marketed by Allied Chemical Corporation. There can also be employed those aniline dyes supplied under the trade name Azosol are produced by General Aniline and Film Corporation. These may be classified according to the following chemical categories: azo acids or amions (Fast Orange RA, Fast Brilliant Red BN and 3BA, Fast Yellows RCA and GT); azine base or cation (Spirit Nigrosine SSB); sulfonate cupric phthalocyanine (Fast Blues HLD and HLR); azo acid phthalocyanine mix (Fast Green HLAS); and triphenylmethanes (Brilliant Green BA and Methyl Violet XXA). Also, organic fluorescent colorants such as fluorescent dyes can be employed, e.g., Rhodamine B, Calcofluor Yellow HEB, and the like. When employing fluorescent colorants, generally larger amounts thereof are used than when employing the above noted aniline dyes.

By the term "pigment" as used herein is meant those colored organic and inorganic compounds which are normally used in the art to impart color as well as organic dyes which are used for the same purpose. There is no restriction as to pigments or dyes except that they be nonreactive to the components of the ink. Illustrative of the various inorganic pigments are titanium dioxide, carbon black, metallic flakes, powders and dusts such as aluminum powder, bronze powder, and the like. Organic pigments and dyes which can be used include Phthalocyanine green, Phthalocyanine blue, Permanent red 2B, Lithol red, Lithol rubine, Toluidine red, Hansa yellow, Toluidine yellow, oil soluble dyes and the like.

There is no criticality in respect to the amount of coloring material to be used. However, sufficient colorant should be used to provide good covering properties with the proper density of color. While economic factors generally determine the maximum amount of pigment to be used, it goes without saying that pigments should not be used in such amounts as to cause the ink to chalk on drying, or to make the viscosity of the ink unreasonably high. Generally, pigments are used in an amount of from 20 to 60 percent based on the total components of the ink. Naturally the specific amount of pigment used is dependent upon the coloring properties of the pigment, the properties of the inks and so forth.

It is an aspect of the novel radiation curable decorative inks of this invention include free radical inhibitors. Suitable free radical inhibitors include p-benzoquinone and methyl ether of hydroquinone. Very small amounts are used to provide stability for the inks when they are not being exposed to ultra violet radiation.

Fillers and waxes which are used in conventional inks can also be used in this ink system. Magnesium carbonate, aluminum carbonate, fumed silicans, waxes such as polyethylenes, polytetrafluroethylenes, fatty esters, and fatty amides can be used.

A highly preferred white ink formulation of this invention is as follows:

|  | Minimum | Maximum |
| --- | --- | --- |
| The reaction product of one mole of pentaerythritol triacrylate; 0.6 mole of toluene diisocyanate and 0.6 mole of hydroxyethyl acrylate. | 20% | 30% |
| The reaction product of one mole of pentaerythritol triacrylate; 0.6 mole of toluene diisocyanate and 0.6 mole of oleyl alcohol. | 10% | 25% |
| The reaction product ester of o-benzoylbenzoic acid and epoxidized oil. | 38% | 40% |
| Benzophenone | 5% | 10% |
| Michler's Ketone | .03% | .05% |
| p-Benzoquinone | .025% | .05% |
| 1,6-Hexanediol Diacrylate | 0% | 10% |
| 60% of the above varnish 40% of TiO$_2$ | | |
| Methyl Diethanolamine | .5% | 20% |
| Diisopropyl Ethanolamine | .5% | 20% |

Any white pigment can be used with ink system. Among them are rutile and anastose titanium dioxides, zinc oxides, etc.

A highly preferred embodiment of a colored ink formulation of this invention is as follows:

|  | Minimum | Maximum |
| --- | --- | --- |
| The reaction product of one mole of pentaerythritol triacrylate; 0.6 mole of toluene diisocyanate and 0.6 mole of hydroxyethyl acrylate. | 30% | 35% |
| The reaction product of one mole of pentaerythritol triacrylate; 0.6 mole of toluene diisocyanate and 0.6 mole of oleyl alcohol. | 10% | 25% |
| The reaction product ester of o-benzoylbenzoic acid and epoxidized oil. | 20% | 30% |
| Benzophenone | 5% | 10% |
| Michler's Ketone | 1% | 2% |
| p-Benzoquinone | .05% | .1% |
| 1,6-Hexanediol Diacrylate | 0% | 10% |
| 85% of the above varnish 15% of phthalo blue |  |  |

The above ink will cure at up to 500 fpm using 4×200 watt per linear inch Hanovia high intensity, medium pressure mercury arc lamps. The adhesion will be satisfactory on sized tin free steel, electrolytic tin plate, and white coated plate. Giving the ink a post bake for 5 minutes at 162.8° C. will improve hardness and adhesion. The ink will withstand pasteurization in alkaline water solutions.

Thus, according to a highly preferred very specific embodiment this invention comprises a radiation curable lithographic metal decorating ink comprising as vehicle and sensitizer: from 20% to 50% of at least one reaction product of toluene
diisocyanate, pentaerythritol triacrylate,
and at least one compound selected from the group consisting of hydroxyethyl acrylate and oleyl alcohol;
from 20% to 50% of a photoreactive resin comprising the
reaction product of ortho-benzoylbenzoic acid and epoxidized oil;
from 5% to 15%, by weight of at least one photoinitiator; and at least one pigment present in an amount to comprise at least 10% but no more than 50% of the total weight of the ink.

According to another of its aspects this invention relates to a novel photoreactive resin comprising the reaction product of ortho-benzoylbenzoic acid and epoxidized oil.

According to one of its preferred embodiments, this invention relates to a white radiation curable lithographic metal decorating ink comprising:
pentaerythritol triacrylate;
at least one other acrylic monomer or oligomer;
at least one photoreactive resin;
at least one photoinitiator;
at least one white pigment; and
at least one organic amine activator.

According to still another of its preferred aspects, this invention relates to a colored radiation curable lithographic metal decorating ink comprising:
at least one reaction product of toluene diisocyanate, pentaerythritol triacrylate,
and at least one alcohol selected from the group consisting of hydroxyethyl acrylate, oleyl alcohol, lauryl alcohol, octyl alcohol, alcohols exhibiting at least 12 and no more than 14 carbon atoms, benzyl alcohol, and furfuryl alcohol;
at least one photoreactive resin comprising the reaction product of ortho-benzoylbenzoic acid and epoxidized linseed oil;
at least one photoinitiator; and
at least one colored pigment.

The resin of this invention is the epoxy ester of Epoxol 9-5 (Swift Chemical trade name for epoxidized oil which is a high oxirane [9% minimum] epoxidized triglyceride) and ortho benzoyl benzoic acid. The mole ratios of this resin are one mole of Epoxol 9-5 reacted with approximately 4.45 moles of ortho benzoyl benzoic acid.

The resin is unique for photoreactive systems because of the benzophenone moiety contained within. When photo-irradiated with ultra violet radiation the benzophenone group serves as a source for free radical formation either directly or indirectly through hydrogen abstraction or abstraction of some other atom. Incorporating this resin into photocurable printing inks or coatings usually results in improving the curing rate of the ink or coating.

The oil portion of the molecule gives excellent wetting to many pigments, improves ink rheology, and generally improves adhesion on various metal substrates. Also, water repellancy is improved because of this oil portion. This is very important in wet lithography when printing inks are in direct contact with fountain solutions.

SYNTHESIS OF RESIN

By weight, 49.56% Epoxol 9-5, 50.11% of o-benzoyl benzoic acid and 0.33% of triethanolamine are charged into a kettle. An inert gas sparge such as $CO_2$ is used in the process. Heat is applied to the charge until a temperature of 137.8° C. is reached. At this temperature, heating of the charge is discontinued for a short time because of an exotherm which is reached at about 137.8° C. This exotherm reaches a temperature of about 198.8° C. When the temperature stabilizes, heat is again supplied to the charge until the temperature range reaches 212.7°–218.3° C. The temperature is held at 212.7°–218.3° C. for an acid number of 16 or less.

Triethanolamine serves as an essential catalyst in obtaining the low acid number.

The finished resin ester product is an amber colored, hard thermoplastic. The melting point of this resin is approximately 93.3° C.

The following describes specific decorating products for metal beer and beverage containers.

Acrylic monomers and coatings were applied with a ¼", #3 wire wound rod. The inks were printed with a "Little Joe" proofing press using an ink volume of 8 notches on the IPI volumetric pipette. The dry film thickness was determined with the Accuderm thickness gauge and found to vary within 0.13–0.14 mil and 0.14–0.19 mil for coatings and inks, respectively.

Uncoated beer body blanks of tin free steel (TFS) and electrotinplated steel (ETP) were used as substrates. Also used were aluminum Q panels.

Curing of the wet film was accomplished in a U.V. tunnel. The U.V. lamp arrangement and the light radiant intensity were conventional. The extent of cure attained was determined immediately after U.V.-exposure by exerting strong finger pressure on the cured film. The condition of the film varied from dry hard (DH) to wet (W) without apparent viscosity buildup and was recorded using the appropriate designation.

Since the optimum film properties were never reached with U.V. curing alone, samples were baked for 2½ minutes at 221° C. before testing.

The viscosity of the samples was measured with a Haake "Rotovisco" viscometer, Model RV using a cone and plate assembly.

Adhesion to metal substrates was tested with one-inch wide #610 Scotch Tape. In this test cured films are crosshatched and Scotch Tape firmly applied over the marked area is removed with a sudden pull. The adhesion was judged satisfactory (S) when the cured film was not lifted from the substrate. Partial removal was judged as marginal (M) and complete removal of the film at the contact area as unsatisfactory (U).

Flexibility of the film was judged with an ⅛" mandrel and a 180° bend. Loss of adhesion at the bend area, determined with Scotch Tape, was judged unsatisfactory. Films that did not peel off with the Scotch Tape in the flexed area were judged to be satisfactory.

Pasteurization resistance was determined by immersion of cured films in a water bath for specified times and subsequently tested for adhesion with Scotch Tape. The alkali bath contained 0.198 g of sodium thiosulfate and 0.052 g of potassium hydroxide per liter of tap water. The pH of the solution at ambient temperatures was 9.4. The test consisted of 35 minutes immersion at 65° C. This pasteurization was changed in the later part of the program to a chromate bath. The chromate bath contained 0.24 g of sodium bichromate and 2.0 g of borax per liter of tap water. The pH of the bath was 8.7. The test consisted of 20 minutes immersion at 65° C. The alkali bath was by far the more severe test and not many materials passed it. It was found that the character of the substrate was also important. The same materials that passed the alkali pasteurization test on ETP and TFS failed when applied to two-piece steel cans. Color retention after oven bake or color development after U.V. exposure was judged qualitatively by visual comparison.

Reactive monomers selected for evaluation are listed in Table I.

Curability of the monomers was determined with a drawdown on aluminum Q panels. To protect the films from the belt heat, Q panels were sent through the U.V. tunnel thermally insulated with ¼" plexiglass plates.

For pigmented formulations benzil/TEA was preferred over the isobutyl ether of benzoin because it cured through to the surface.

The pigment was dispersed with a laboratory size three-roll mill, usually in three passes.

The performance properties of the ink in terms of curability, adhesion and pasteurization resistance were tested on ETP. All inks were printed with a "Little Joe" proofing press.

Test results indicate that the commercially available products do not satisfy the performance requirements of metal deco inks.

The materials that were synthesized were subjected to a preliminary screening test to determine solubility in reactive monomers, curability, film forming characteristics, color, adhesion, etc.

Curing efficiency of different sensitizers in the white ink was tested using the formulation of this invention.

Sensitizers tested and results obtained for the white ink are listed in Table II. In Table III are shown the curing efficiencies of sensitizers in a clear vehicle. For comparison, also included are the curing speeds produced by addition of one phr of triethanol amine.

Photopolymerization of a free radical system containing sensitizers was shown to be enhanced by addition of triethanol amine (see Table III). The mechanism is based on charge transfer in the complex formed between a photoactivated sensitizer and a ground state amine. The free radicals formed by photodecomposition of the complex are the initiating species.

The effect of different amines on the curing speed of the white ink sensitized with benzil was tested and results are reported in Table IV. The composition of the ink was similar to the one shown supra. The concentration of benzil, however, was reduced to 3 phr. It was felt that such a concentration is more practical due to the inherent color of benzil. Concentration of amines was limited to 0.0067 M (equivalent of 1.0 gram of triethanol amine), which was found to be an optimum concentration.

The accelerating efficiency of amines was judged by their ability to cure the white ink under different conditions. An arbitrary scale selected for this test is shown at the bottom of Table IV. Also included in the table is the effect of the different amines on white ink stability. Materials used in the ink were as received without addition of stabilizers.

The requirements for wet litho applications could not be met with commercial products. Formulations that were developed showed either excessive emulsification with fountain solutions, scumming or complete ink breakdown (separation of pigment and vehicle).

The results of the foregoing tests show that the most suitable sensitizers for white inks are 2-chlorothioxanthone, benzil and benzophenone in order of decreasing effectiveness. In the presence of alkanolamines the first two produced films cured through to the surface while benzophenone cured predominantly on the surface. The benzophenone curing efficiency was improved appreciably when used with Michlers Ketone.

Tertiary alkanolamines were found to be the most suitable accelerators. They produced good synergism and very good shelf life.

TABLE I

| | | VISCOSITY IN CPS AT 25° C. | CURABILITY** BELT SPEED IN F/MIN. | | | | | |
|---|---|---|---|---|---|---|---|---|
| | MONOMERS | | 50 | 100 | 200 | 300 | 400 | 500 | 600 |
| Polyacrylates | Pentaerythritol Triacrylate | 1,000.0 | DH*** | DH | D-S | D-S | D-S | D-S | D-S |
| | Trimethylol Propane Triacrylate | 48.0 | DH-S | D-S | D-W | D-W | D-W | D-W | DS-W |
| Diacrylates | Neopentyl Glycol Diacrylate | 5.0 | D-S | D-S | D-S | DS-S | DVS | Gel | Gel |
| | 1,6 Hexanediol Diacrylate | 20.0 | D-S | D-W | DS-W | DS-W | Gel | WTH | |
| | 1,10 Decanediol Diacrylate | 27.0 | D-S | D-S | D-W | WTH | | | |
| | Triethylene Glycol Diacrylate | 30.0 | DH | D-S | D-W | DS-W | WTH | | |
| | Tetraethylene Glycol Diacrylate | 32.0 | DH | D-S | D-W | DS-W | WTH | | |

TABLE I-continued

PROPERTIES OF REACTIVE MONOMERS

| | MONOMERS | VISCOSITY IN CPS AT 25° C. | CURABILITY** BELT SPEED IN F/MIN. | | | | | | |
|---|---|---|---|---|---|---|---|---|---|
| | | | 50 | 100 | 200 | 300 | 400 | 500 | 600 |
| Monacrylates | 2-Hydroxyethyl Acrylate | 7.5 | TS | VTS | WTH | | | | |
| | Hydroxypropyl Acrylate | 9.0 | D-S | D-T | DS-W | WTH | | | |
| | n-Butyl Acrylate | 5.0 | WTH | | | | | | |
| | Cellosolve Acrylate | 2.5 | WTH | | | | | | |
| | Methyl Cellosolve Acrylate | 5.0 | WTH | | | | | | |
| | Phenoxyethyl Acrylate | 300.0 | DH | D-S | WTH | | | | |
| | Vinyl Pyrol | 2.5 | DH | D-S | WTH | | | | |
| Methacrylates | Trimethylol Propane Trimethacrylate | 14.0 | D-W | DS-W | Gel | WTH | | | |
| | 1,3 Butanediol Dimethacrylate | 5.0 | WTH | | | | | | |
| | Triethylene Glycol Dimethacrylate | 7.5 | WTH | | | | | | |
| | Isodecyl Methacrylate | 5.0 | WTH | | | | | | |
| | Stearyl Methacrylate | 10.0 | WTH | | | | | | |
| | Dimethylaminoethyl Methacrylate | 11.0 | WTH | | | | | | |

**10 phr of isobutylether of benzoin. One Hanovia 200 W/1" and four Gates 68 W/1" mounted 3" above surface.
***DH = dry, hard; D = dry; DS = dry, soft; S = soft; T = tacky; VTS = very tacky, soft; W = wet; WTH = wet through.

TABLE II

U. V. SENSITIZERS TESTED IN THE WHITE INK

| SENSITIZER | ABSORPTION MAX. IN N.M. | MOLAR EXTINCTION COEFFICIENT | CURABILITY MAX BELT SPEED IN F/M TO PRODUCE DRY AND HARD INK FILM | STABILITY IN AMBIENT CONDITIONS |
|---|---|---|---|---|
| Benzoin | 250 | 16,260 | 50. Surface cure only. Film wrinkled. | V. Poor. Gelled in 24 hours. |
| Benzoin Ethers (Methyl, Ethyl, Isobutyl) | 245 | 11,820 | 100. Surface cure only. | Poor. Gelled in 2-3 days. |
| | 245 | 12,250 | | |
| | 245 | 15,300 | | |
| Acetophenone | 240 | 12,325 | <<50. | Good. Gelled in 3 months. |
| Dimethoxy Acetophenone | 210 | 16,790 | 300. Surface cure. Surface inhibited at higher speed. | Good. Gelled in 3 months. |
| | 225 | 16,790 | | |
| | 265 | 21,900 | | |
| | 250 | 6,150 | | |
| | 335 | 3,780 | | |
| | 225 | 7,600 | | |
| | 270 | 11,100 | | |
| | 300 | 7,600 | | |
| | 210 | 23,570 | | |
| | 260 | 5,360 | | |
| | 315 | 2,100 | | |
| Benzophenone | 250 | 17,715 | 300. Surface cure with amines. Cured through with Michlers Ketone. | V. Good. Stable for 6 months |
| 4-Bromobenzophenone | 260 | 20,010 | 300. Surface cure only. | V. poor. Gelled in 24 hours. |
| Triphenyl Phosphine | 260 | 17,140 | 100. Surface cure only. | Good. Gelled in 3 months. |
| Benzil | 260 | 25,200 | 300. Cures through. | V. good. Stable for 6 months. |
| 4,4'-Dimethoxy Benzil | 220 | 21,645 | 200. Cures through. | Good. Gelled in 4 months. |
| | 295 | 30,830 | | |
| 2,Chlorothioxanthone | 220 | 17,517 | 350. Cures through. | V. good. Stable for 6 months. |
| | 260 | 40,950 | | |
| 4-(Dimethylamino)-Benzophenone | 245 | 14,000 | 50. Surface cure only. | Poor. Gelled in 2-3 days. |
| | 250 | 22,780 | | |
| p-(4-Methylpiperazino)-Acetophenone | 235 | 5,520 | 50. Surface cure only. | Not tested. |

*Ink samples were stored at room temperature. Materials used in the ink preparation were used as received from suppliers without addition of stabilizers.

TABLE III

RELATIVE CURING EFFICIENCY OF DIFFERENT SENSITIZERS IN THE CLEAR COATING**

| | CURING EFFICIENCY | | | | | | | | | | | |
|---|---|---|---|---|---|---|---|---|---|---|---|---|
| | WITHOUT AMINE | | | | | | WITH 1% WEIGHT OF N-METHYL DIETHANOL AMINE | | | | | |
| SENSITIZERS (2 phr) | 50 | 100 | 200 | 300 | 400 | 600 | 100 | 200 | 300 | 400 | 500 | 600 |
| 2,4-Dimethoxy Acetophonone | DH | DH* | W | — | — | — | DH | DH | DH | DH* | DH* | DS* |
| 2,5-Dimethoxy Acetophenone | DH | DH* | DS* | W | — | — | DH | DH | DH | DH | DH* | DH* |
| 3,5-Dimethoxy Acetophenone | DH | DH* | W | — | — | — | DH | DH | DH* | DH* | DH* | DH* |
| Triphenyl Phosphine | DH | DH* | DS* | W | — | — | DH | DVH | DVH | Surface cure only. | | |
| 2-Chlorothioxanthone | DH | DH | DH* | DH* | DH* | DH* | DH | DVH | DVH | DH | DH | DH |
| Benzil | DH | DH | DH* | ST* | T* | VTS* | DH | DH | DH | DH | DH* | DH* |
| 4,4'-Dimethoxy Benzil | DH | DH | DS* | DS* | S | wrinkled | DH | DH | DH | DH | DH* | DH* |

TABLE III-continued

RELATIVE CURING EFFICIENCY OF DIFFERENT SENSITIZERS IN THE CLEAR COATING**

| SENSITIZERS (2 phr) | CURING EFFICIENCY | | | | | | | | | | | |
|---|---|---|---|---|---|---|---|---|---|---|---|---|
| | WITHOUT AMINE | | | | | | WITH 1% WEIGHT OF N-METHYL DIETHANOL AMINE | | | | | |
| | 50 | 100 | 200 | 300 | 400 | 600 | 100 | 200 | 300 | 400 | 500 | 600 |
| 4-(Dimethylamino)-Benzophenone | DH | Surface cure only and progressively wrinkled. | | | | | DH | DH | Surface cure only. | | Yellow | |
| p-(4-Methylpiperazino)-Acetophenone | DH | Surface cure only. | | | | | Dry only on the surface. | | | | Slightly yellow. | |
| Benzophenone | DS | W | — | — | — | — | T | VT | W | — | — | — |

*Surface inhibited.
DH = dry, hard; DVH = dry very hard; DS = dry soft; W = wet; S = soft; ST = slightly tacky; T = tacky; VT = very tacky; VTS = very tacky, soft.
**Prototype Clear Coatings (phr)

TABLE IV

AMINES TESTED AS ACCELERATORS FOR BENZIL IN THE WHITE INK FORMULATION.

Benzil - 3.0% Weight; Amines - 0.006 mol. This is an equivalent of 1% weight of the triethanol amine which was found to be an optimum concentration.

| | FORMULA WEIGHT | VAPOR PRESSURE IN mmHg AT 20° C. | ACCELERATING EFFICIENCY* | STABILITY IN AMBIENT CONDITIONS - TIME TO GELLATION |
|---|---|---|---|---|
| Monoethanol Amine | 61.08 | <1.0 | V. Good | Ten minutes |
| Diethanol Amine | 105.14 | <0.01 | V. Good | Two days |
| Triethanol Amine | 149.15 | <0.01 | V. Good | <Six months |
| N-Methyl Ethanol Amine | 75.15 | <1.0 | V. Good | Five days |
| N-Methyl Diethanol Amine | 119.16 | <0.01 | V. Good | Seven days |
| N,N-Dimethyl Ethanol Amine | 89.16 | 4.4 | Good | <Three months |
| Triisopropanol Amine | 191.27 | <0.01 | Good | <Six months |
| N,N-Diisopropyl Ethanol Amine | 145.25 | <1.0 | Good | <Seven days |
| N,N-Diethyl Hydroxyl Amine | 89. | | None | Excellent stability can be used as stabilizer |
| Benzyl Amine | 107.24 | | Good | Two days |
| Dibenzyl Amine | 197.27 | | Good | Three days |

Accelerating ability of amines was judged according to the following arbitrary scale. The ink film cured to a dry and hard condition with one Hanovia and three Gates lamps:
300–200 f/m - very good
200–100 f/m - good
100–50 f/m - satisfactory
100 f/m slightly tacky - poor
100 f/m - wet but pronounced viscosity build up - very poor

We claim:

1. A radiation curable lithographic metal decorating ink comprising as vehicle and sensitizer:
   from 20% to 50% of at least one reaction product of 0.6 mol of toluene diisocyanate, one mol of pentaerythritol triacrylate, and 0.6 mol of at least one compound selected from the group consisting of hydroxyethyl acrylate and oleyl alcohol;
   from 20% to 50% of a photoreactive resin comprising the reaction product of ortho-benzoyl benzoic acid and epoxidized linseed oil in a molar ratio of 4.45 to one;
   from 5% to 15%, by weight, of at least one photoinitiator; and
   at least one pigment present in an amount to comprise at least 10% but no more than 50% of the total weight of the ink.

2. A colored radiation curable lithographic metal decorating ink comprising:
   at least one reaction product of 0.6 mol of toluene diisocyanate, one mol of pentaerythritol triacrylate, and 0.6 mol of at least one alcohol selected from the group consisting of hydroxyethyl acrylate, oleyl alcohol, lauryl alcohol, octyl alcohol, alcohols exhibiting at least 12 and no more than 14 carbon atoms, benzyl alcohol, and furfuryl alcohol;
   20% to 30% of at least one photoreactive resin comprising the reaction product of ortho-benzoyl benzoic acid and epoxidized linseed oil in a molar ratio of 4.45 to one;
   at least one photoinitiator; and
   at least one colored pigment.

3. A radiation curable lithographic metal decorating ink comprising as vehicle and sensitizer:
   from 20% to 50% of at least one reaction product of toluene diisocyanate, pentaerythritol triacrylate, and at least one compound selected from the group consisting of hydroxyethyl acrylate and oleyl alcohol;
   from 20% to 50% of a photoreactive resin comprising the reaction product of ortho-benzoic acid and epoxidized linseed oil in a molar ratio of 4.45 to one;
   from 5% to 15%, by weight, of at least one photoinitiator; and
   at least one pigment present in an amount to comprise at least 10% but no more than 50% of the total weight of the ink.

4. An ink formulation comprising the reaction product of one mol of pentaerythritol triacrylate; 0.6 mol of toluene diisocyanate and 0.6 mol of hydroxyethyl acrylate; the reaction product of one mol of pentaerythritol triacrylate; 0.6 mol of toluene diisocyanate and 0.6 mol of oleyl alcohol; the reaction product ester of o-benzoyl benzoic acid and epoxidized linseed oil in a molar ratio of 4.45 to one; benzophenone; Michler's Ketone; p-benzoquinone; 1,6-hexanediol diacrylate; 85% of the above varnish and 15% of phthalo blue.

5. A white ink formulation comprising the reaction product of one mol of pentaerythritol triacrylate; 0.6 mol of toluene diisocyanate and 0.6 mol of hydroxyethyl acrylate; the reaction product of one mol of pentaerythritol triacrylate; 0.6 mol of toluene diisocyanate and 0.6 mol of oleyl alcohol; the reaction product ester of o-benzoyl benzoic acid and epoxidized linseed oil in a molar ratio of 4.45 to one; benzophenone; Michler's Ketone; p-benzoquinone; 1,6-hexanediol diacrylate; 60% of the above varnish; 40% of $TiO_2$, methyl diethanolamine; and diisopropyl ethanolamine.

* * * * *